(12) United States Patent
Ito et al.

(10) Patent No.: US 6,522,968 B1
(45) Date of Patent: Feb. 18, 2003

(54) DEVICE FOR ESTIMATING ROAD FRICTION STATE (75) Inventors: Shoji Ito, Susono; Masaki Yamamoto, Toyota; Takaji Umeno, Aichi-gun; Katsuhiro Asano, Aichigun; Yasushi Amano, Aichi-gun; Satoru Onozawa, Anjo; Shusaku Fujimoto, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 58 days.

(21) Appl. No.: 09/694,681

(22) Filed: Oct. 24, 2000

(30) Foreign Application Priority Data

Nov. 5, 1999 (JP) .......................... 11-315258

(51) Int. Cl.$^7$ ................................ B60T 8/00
(52) U.S. Cl. ..................... 701/80; 701/74; 180/197
(58) Field of Search .................. 701/80, 82, 74, 701/71; 303/150; 180/197

(56) References Cited

U.S. PATENT DOCUMENTS

| | | | | |
|---|---|---|---|---|
| 4,875,171 A | * | 10/1989 | Fujioka et al. | 700/280 |
| 4,912,967 A | * | 4/1990 | Shiraishi et al. | 73/105 |
| 5,085,288 A | * | 2/1992 | Shiraishi et al. | 180/197 |
| 5,435,635 A | * | 7/1995 | Watanabe | 303/166 |
| 5,583,772 A | * | 12/1996 | Kitano et al. | 303/158 |
| 5,634,699 A | * | 6/1997 | Ichikawa et al. | 303/150 |
| 5,662,393 A | * | 9/1997 | Kamiya et al. | 303/191 |
| 5,809,445 A | * | 9/1998 | Yamamoto et al. | 180/197 |
| 5,833,328 A | | 10/1998 | Matsuda | |
| 5,948,961 A | * | 9/1999 | Asano et al. | 73/9 |
| 6,264,292 B1 | | 7/2001 | Umeno et al. | |

FOREIGN PATENT DOCUMENTS

| | | | |
|---|---|---|---|
| DE | 38 12 600 C2 | 11/1988 | |
| EP | 0 645 288 A2 | 3/1995 | |
| EP | 0 981 904 A2 | 1/1999 | |
| JP | 08119086 A | * 5/1996 | ............ B60T/8/58 |
| JP | 10002813 A | * 1/1998 | ............ G01L/5/00 |
| JP | 10-114263 | 5/1998 | |

* cited by examiner

Primary Examiner—Michael J. Zanelli
Assistant Examiner—Eric M Gibson
(74) Attorney, Agent, or Firm—Oliff & Berridge, PLC (57) ABSTRACT A device for estimating a road friction state in which a friction state of a wheel with respect to a road surface can be estimated accurately. A bandpass filter extracts, from a wheel speed signal detected by a wheel speed detecting unit, a portion of the wheel speed signal in a predetermined range which includes a torsion resonance point at which a frequency is greater than a low frequency regions. A vibration level computing unit computes a vibration level of the wheel speed signal. A road friction state estimating unit estimates the friction state of the wheel with respect to the road surface on the basis of a vibration level computed by the vibration level computing unit and an estimated value of a road $\mu$ slope computed by a $\mu$ slope computing unit, and on the basis of a relationship between the two determined for each road surface state.

16 Claims, 10 Drawing Sheets

DEVICE FOR ESTIMATING ROAD FRICTION STATE

BACKGROUND OF THE INVENTION

1. Field of the Invention

The present invention relates to a device for estimating a road friction state, and in particular, to a device for estimating a road friction state in which the friction state of a wheel with respect to a road surface is estimated on the basis of a physical amount expressing the ease of slippage of the wheel, such as the road $\mu$ slope which is the slope of the friction coefficient between the wheel and the road surface, with respect to the slip speed.

2. Description of the Related Art

Conventionally, there has been proposed a device in which a wheel speed signal is detected, and the road $\mu$ slope is estimated on the basis of the detected wheel speed signal. In this device, the wheel speed signal is detected in order to estimate the road $\mu$ slope. Thus, the estimated value of the road $\mu$ slope is small at times when the wheel rides over projections or on rough road surfaces such as on packed snow. Accordingly, the accuracy of estimating the road $\mu$ slope is poor.

Figure 10:
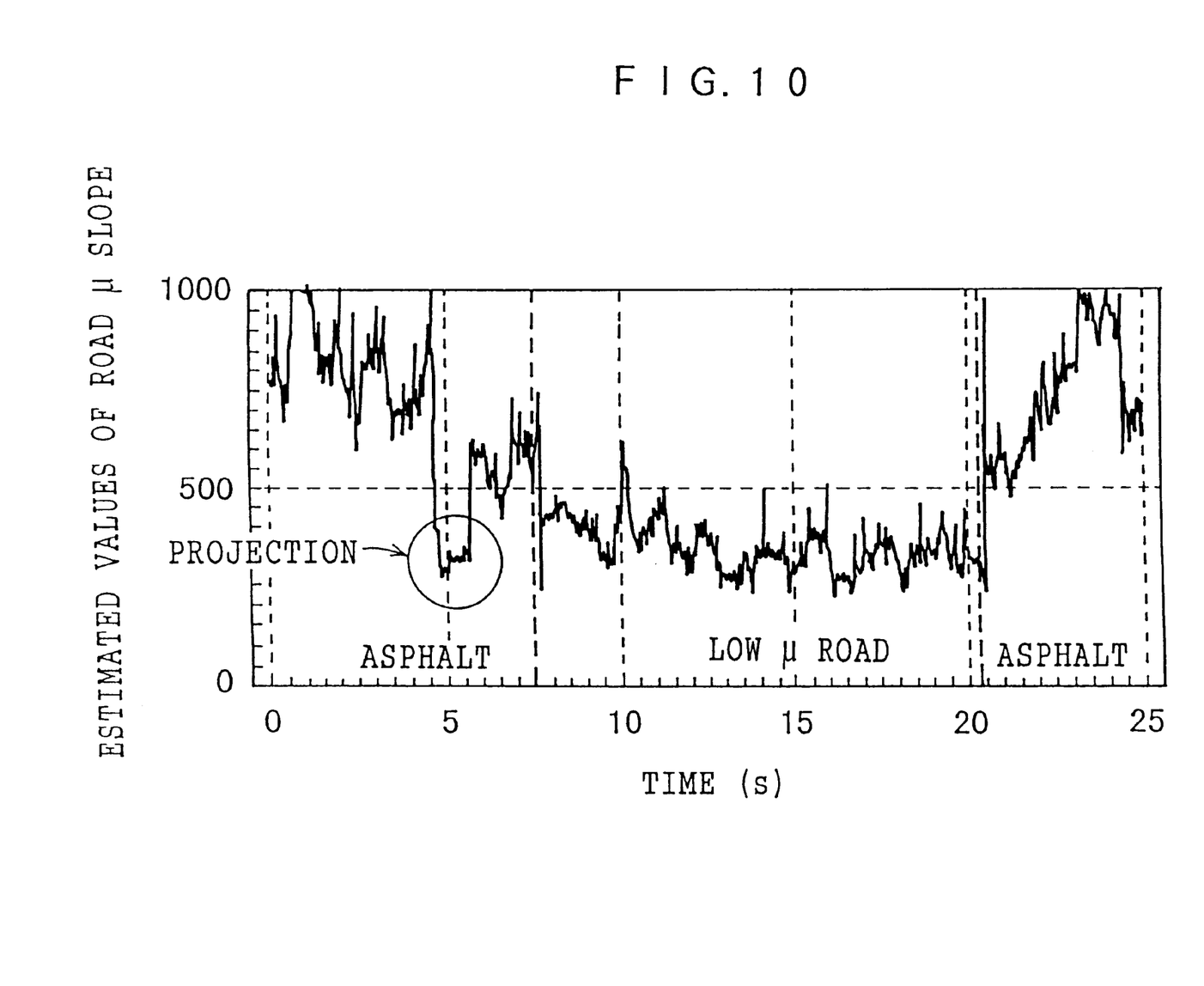
FIG. 10 is a graph illustrating changes in an estimated value of road $\mu$ slope at a time when a wheel rides over a projection before travelling on a low $\mu$ road.

For example, as illustrated in FIG. 10, when the wheel rides over a projection while travelling on an asphalt road, as described above, the wheel speed signal is small. The estimated value of the road $\mu$ slope estimated at this time is small, and is about the same value as the estimated value of the road $\mu$ slope on a low $\mu$ road. When the wheel rides over a projection, there may be cases in which it is judged that the vehicle is traveling on a low $\mu$ road.

SUMMARY OF THE INVENTION

The present invention was developed in consideration of the above facts, and an object thereof is to provide a device for estimating a road friction state which can accurately estimate the friction state of a wheel with respect to a road surface.

A first aspect of the present invention is a device, for use with a vehicle having wheels, for estimating a road friction state, said device comprising: a sensor which detects a wheel speed signal; a filter which receives the signal and passes a portion of the wheel speed signal having a frequency within a predetermined range, the range including at least one resonance point or at least one antiresonance point; a computer which computes a physical amount expressing a magnitude of vibration of a wheel, on the basis of the portion of the wheel speed signal passed by the filter; an estimator which estimates a physical amount expressing ease of slippage of the wheel, on the basis of the portion of the wheel speed signal passed by the filter; and a road friction state estimator which estimates a friction state of the wheel with respect to a road surface, on the basis of the physical amount expressing the magnitude of the vibration of the wheel computed by the computer and the physical amount expressing the ease of slippage of the wheel estimated by the estimator.

The sensor of the present invention detects a wheel speed signal. The filter passes, from the wheel speed signal detected by the sensor, a portion of the wheel speed signal within a predetermined range which includes at least one resonance point or at least one antiresonance point and in which the frequency is great than a low frequency region.

The computer computes a physical amount expressing the magnitude of the vibration of the wheel, on the basis of the portion of the wheel speed signal extracted by the filter. The physical amount expressing the magnitude of the vibration of wheel may be the vibration level or the amplitude of the portion of the wheel speed signal extracted by the filter.

The estimator estimates a physical amount expressing the ease of slippage of the wheel, on the basis of the wheel speed signal detected by the sensor. Here, the physical amount expressing the ease of slippage of the wheel may be the road $\mu$ slope which is the slope of the friction coefficient $\mu$ between the wheel and the road surface for a slip speed, or may be the braking torque slope which is the slope of the braking torque for a slip speed, or may be the driving torque slope which is the slope of the driving torque.

The relationship between the physical amount expressing the magnitude of the vibration of the wheel and the physical amount expressing the ease of slippage of the wheel is determined for each road surface state.

Thus, the estimator estimates the friction state of the wheel with respect to the road surface, on the basis of the physical amount expressing the magnitude of the vibration of the wheel computed by the computer and on the basis of the physical amount expressing the ease of slippage of the wheel estimated by the estimator.

The friction state of the wheel with respect to the road surface is estimated on the basis of the physical amount expressing the magnitude of the vibration of the wheel and the physical amount expressing the ease of slippage of the wheel. Thus, the friction state of the wheel with respect to the road surface can be judged accurately.

The physical amount expressing the magnitude of the vibration of the wheel increases proportionally to the reciprocal of the physical amount expressing the ease of slippage of the wheel. Namely, the physical amount expressing the magnitude of the vibration of the wheel and the physical amount expressing the ease of slippage of the wheel exhibit an inverse relationship. As a result, even if the friction state of the wheel with respect to the road surface is estimated on the basis of the physical amount expressing the magnitude of the vibration the wheel and the physical amount expressing the ease of slippage of the wheel which are determined by extracting a portion of the wheel speed signal in a low frequency region, the friction state of the wheel with respect to the road surface cannot be judged accurately.

Here, in the present invention, in order to estimate the friction state, a portion of the wheel speed signal in a predetermined range which is greater than a low frequency region is extracted, and the friction state of the wheel with respect to the road surface can be judged accurately.

Another aspect of the present invention is a device, for use with a vehicle having wheels, for estimating a road friction state, said device comprising: a sensor which detects a wheel speed signal; an estimator which estimates a physical amount expressing an ease of slippage of a wheel, on the basis of the wheel speed signal detected by the sensor; a computer which computes a rate of change in the physical amount expressing the ease of slippage of the wheel which was estimated by the estimator; and a road friction state estimator which, on the basis of the physical amount expressing the ease of slippage of the wheel estimated by the estimator and the rate of change in the physical amount expressing the ease of slippage of the wheel computed by the computer, estimates a friction state of the wheel with respect to a road surface.

The relationship between the physical amount expressing the ease of slippage of the wheel and the rate of change in the physical amount expressing the ease of slippage of the wheel is determined for each road surface state.

The road friction state estimator estimates the friction state of the wheel with respect to the road surface on the basis of the physical amount expressing the ease of slippage of the wheel estimated by the estimator and the rate of change in the physical amount expressing the ease of slippage of the wheel which is computed by the computer.

In this way, the friction state of the wheel with respect to the road surface is estimated on the basis of the physical amount expressing the ease of slippage of the wheel and the rate of change in the physical amount expressing the ease of slippage of the wheel. Thus, the friction state of the wheel with respect to the road surface can be judged accurately.

In the present invention, in order to estimate the friction state, a portion of the wheel speed signal in a predetermined range which is greater than low frequency region is extracted. Thus, the friction state of the wheel with respect to the road surface can be judged accurately.

DESCRIPTION OF THE PREFERRED EMBODIMENTS

A first embodiment of the present invention will be described hereinafter with reference to the drawings.

Figure 1:
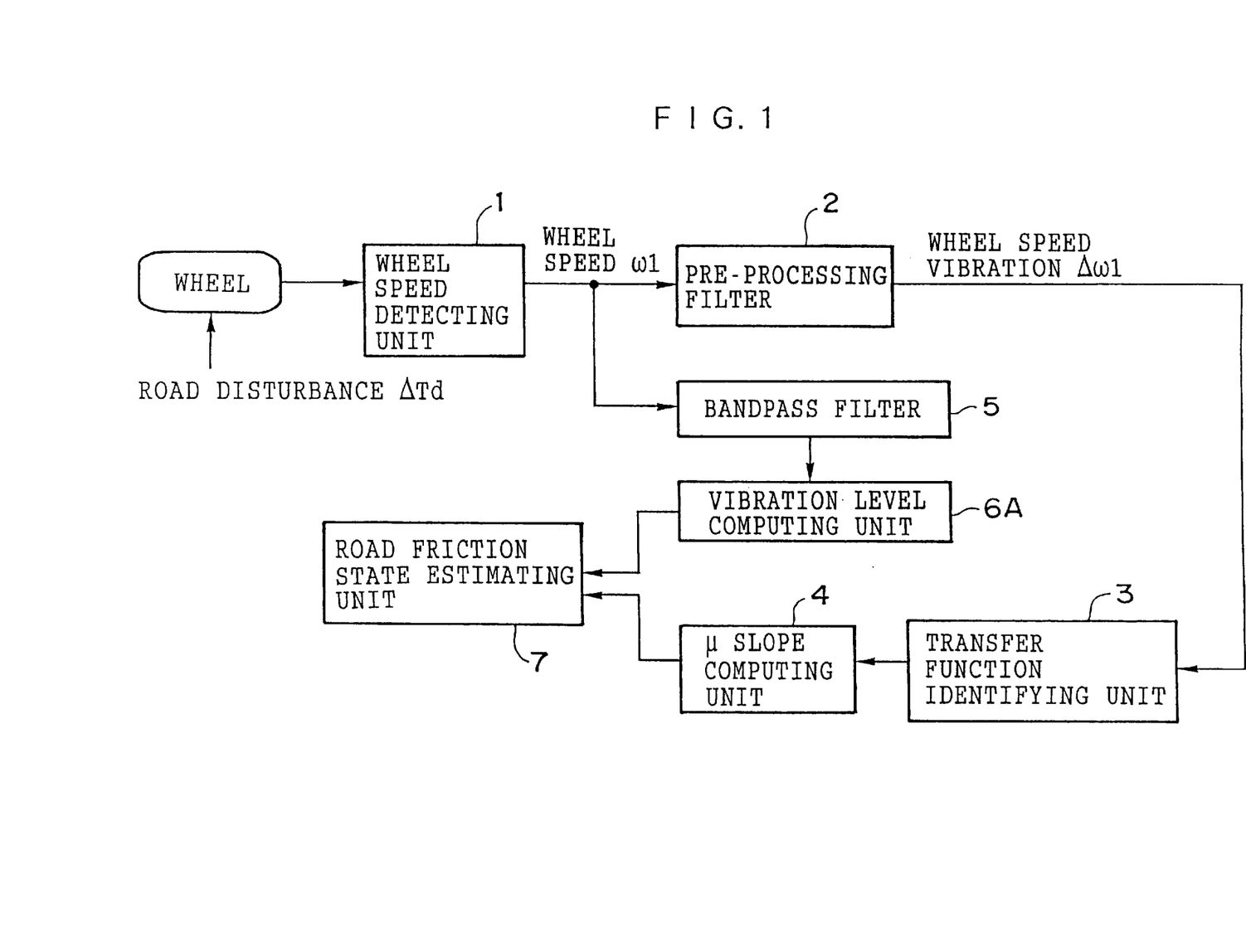
FIG. 1 is a block diagram of a first embodiment of the present invention.

FIG. 1 illustrates the structure of a device for estimating road friction relating to a first embodiment. As is shown in FIG. 1, the device for estimating road friction includes a wheel speed detecting unit 1, a pre-processing filter 2, a transfer function identifying unit 3, and a $\mu$ slope computing unit 4. The wheel speed detecting unit 1 detects a wheel speed signal $\omega_1$ of each wheel. The pre-processing filter 2 detects a wheel speed vibration $\Delta\omega_1$ of each wheel as a response output of a wheel resonance system which receives road disturbance $\Delta T_d$ from the detected wheel speed signal $\omega_1$ of each wheel. The transfer function identifying unit 3, by using the method of least squares, identifies the transfer function for each wheel which satisfies the detected wheel speed vibration $\omega_1$. The $\mu$ slope computing unit 4 computes, for each wheel, the slope of a friction coefficient $\mu$ between the tire and the road, on the basis of the identified transfer function.

The wheel speed detecting unit 1 in FIG. 1 is formed by a wheel speed sensor which outputs a sensor output signal corresponding to the wheel speed, and a computing section which computes the actual rotational speed signal of each wheel from the sensor output signal.

The pre-processing filter 2 may be a bandpass filter which allows passage of only frequency components of a given band centered about a frequency which is estimated to be the resonance frequency of the wheel resonance system, or may be a high pass filter which allows passage of only wavelength components of a high band including the resonance frequency component. In the present embodiment, the parameters prescribing the frequency characteristic of the bandpass filter or the high pass filter are fixed at constant values.

Direct current components are removed from the output of the pre-processing filter 2. Namely, only the wheel speed vibration $\Delta\omega_1$ around the wheel speed signal $\omega_1$ is extracted.

Here, the transfer function F(s) of the pre-processing filter 2 is $$F(s) = \frac{1}{\sum_{i=0}^{m} c_i s^{m-1}} \quad (1)$$

wherein $c_i$ is a coefficient of the filter transfer function, and s is a Laplace operator.

Next, the transfer function identifying unit 3 derives a dependent computation formula. In the present embodiment, the computation of the pre-processing filter 2 is included in the computation of the transfer function identifying unit 3.

First, the transfer function which is to be identified in the present first embodiment is modeled two-dimensionally by using the road disturbance $\Delta T_d$ as the excitation input and the wheel speed vibration $\Delta\omega_1$ detected by the pre-processing filter 2 at this time as the response output. Namely, the following vibration model is postulated.

$$\Delta\omega_1 = \frac{b_2}{\sum_{i=0}^{2} a_i s^{2-i}} \Delta T_d + v, \quad a_0 = 1 \quad (2)$$

Here, v is the observed noise included at the time of observing the wheel speed signal. By transforming formula (2), the following formula is obtained.

$$\sum_{i=0}^{2} a_i s^{2-i} \Delta\omega_1 = b_2 \Delta T_d + \sum_{i=0}^{2} a_i s^{2-i} v \quad (3)$$

First, the formula obtained by using the pre-processing filter of formula (1) on formula (3) is discretized. At this time, $\Delta\omega_1$, $\Delta T_d$, and v are expressed as discretized data $\Delta\omega_1(k)$, $\Delta T_d(k)$, and v(k) sampled for each sampling period Ts (wherein k is the sampling number; k=1, 2, 3, . . . ). Further, the Laplace operator s can be discretized by using a predetermined discretizing method. In the present embodiment, as one example, discretizing is carried out by the following bilinear conversion. Note that d is a 1 sample delay operator.

$$s = \frac{2}{T_d} \frac{1-d^{-1}}{1+d^{-1}}$$

The next number m of the pre-processing filter is preferably 2 or greater. Thus, in the present embodiment, in consideration of the computation time as well, m=2, and the following formulas are obtained thereby.

$$\sum_{i=0}^{2} a_i \xi_{vi}(k) = b_2 \xi_{u2}(k) + \sum_{i=0}^{2} a_i \xi_{vi}(k) \quad (4)$$

wherein $$\xi_{vi}(k) = \left(\frac{T_d}{2}\right)^i (1+d)^i (1-d)^{2-i} F_0(d) \Delta\omega_1(k) \quad (5)$$

$$\xi_{u2}(k) = \left(\frac{T_d}{2}\right)^2 (1+d)^2 F_0(d) \Delta T_d(k) \quad (6)$$

$$\xi_{vi}(k) = \left(\frac{T_d}{2}\right)^i (1+d)^i (1-d)^{2-i} F_0(d) v(k) \quad (7)$$

$$F_0(d) = \frac{1}{\sum_{i=0}^{2} c_i \left(\frac{T_d}{2}\right)^i (1+d)^i (1-d)^{2-i}} \quad (8)$$

In order to identify the transfer function from each data of the wheel speed vibration $\Delta\omega_1$ on the basis of the least squares method, formula (4) is converted as per the following formulas so as to be in the form of a linear function relating to the parameters to be identified. Note that the subscript "$T$" denotes transposition of the matrix.

$$\xi_{y0}(k) = \zeta^T(k)\theta + r(k) \quad (9)$$

Here, $$\zeta(k) = [-\xi_{v1}(k) - \xi_{v2}(k)]^T$$

$$\theta = [a_1 \; a_2]^T$$

$$r(k) = b_2 \xi_{u2}(k) + \sum_{i=0}^{2} a_i \xi_{vi}(k) \quad (10)$$

In the above formulas, $\theta$ is the parameter of the transfer function to be identified.

Further, the device for estimating a road friction state of the present embodiment is provided with a bandpass filter 5 which passes, from the wheel speed signal detected by the wheel speed detecting unit, a portion of the wheel speed signal in a predetermined range whose frequency, which includes at least one resonance point or at least one anti-resonance point and at which the frequency is greater than a low frequency region. A vibration level computing unit 6A is connected to the bandpass filter 5. On the basis of the vehicle speed signal extracted by the bandpass filter 5, the vibration level computation unit 6A computes a physical amount expressing the magnitude of the vibration of the wheel (in the present embodiment, the vibration level computation unit 6A computes the vibration level). The device for estimating a road friction state of the present first embodiment also includes a road friction state estimating unit 7 which estimates the friction state of the wheel with respect to the road surface on the basis of the road $\mu$ slope computed by the $\mu$ slope computing unit 4 and on the basis of the vibration level computed by the vibration level computing unit 6A.

Next, operation of the present embodiment will be described.

In the transfer function identifying unit 3, for each of the data obtained by successively adapting the discretized data of the detected wheel speed vibration $\Delta\omega_1$ to formula (11), an unknown parameter $\theta$ is estimated by applying the method of least squares, and the transfer function is thereby identified.

Specifically, the detected wheel speed vibration $\Delta\omega_1$ is converted into digitized data $\Delta\omega(k)$ (k=1, 2, 3, . . . ), N of these data are sampled, and the parameter $\theta$ of the transfer function is estimated by using the method of least squares of the following formula.

$$\hat{\theta}(N) = \left[\sum_{k=1}^{N} \rho^{N-k} \zeta(k) \zeta^T(k)\right]^{-1} \left[\sum_{k=1}^{N} \rho^{N-k} \zeta(k) \xi_{y0}(k)\right] \quad (11)$$

Here, the amounts which are designated by being topped with a carat ("^") are the estimated values.

The aforementioned method of least squares may carry out computation as a successive-type method of least squares which determines the parameter $\theta$ by the following recurrence formulas.

$$\hat{\theta}(N) = \hat{\theta}(N-1) + h(N)[\xi_{y0}(N) - \zeta^T(N)\hat{\theta}(N-1)] \quad (12)$$

$$h(N) = \frac{P(N-1)\zeta(N)}{\rho + \zeta^T(N)P(N-1)\zeta(N)} \quad (13)$$

$$P(N) = 1/\rho\{I - h(N)\zeta^T(N)\}P(N-1) \quad (14)$$

Here, $\rho$ is a so-called forgetting coefficient, and is usually set to a value of between 0.95 and 0.99. At this time, it suffices if the initial value is:

$$\hat{\theta}(-1) = 0, \; P(-1) = \alpha I$$

wherein $\alpha$ is a sufficiently large positive number.

Any of various correction methods of least squares may be used as the method for reducing the error in estimation of the above method of least squares. In the present embodiment, an example which uses an auxiliary variable method, which is a method of least squares in which an auxiliary variable is introduced, is described. In accordance with this method, the parameter of the transfer function is estimated, by using the following formula, with the m(k) in the step in which the relationship of formula (9) was obtained serving as an auxiliary variable.

$$\hat{\theta}(N) = \left[\sum_{k=1}^{N} \rho^{N-k} m(k) \zeta^T(k)\right]^{-1} \left[\sum_{k=1}^{N} \rho^{N-k} m(k) \xi_{y0}(k)\right] \quad (15)$$

Further, successive computation is carried out as follows.

$$\hat{\theta}(N) = \hat{\theta}(N-1) + h(N)[\xi_{y0}(N) - \zeta^T(N)\hat{\theta}(N-1)] \quad (16)$$

$$h(N) = \frac{P(N-1)m(N)}{\rho + \zeta^T(N)P(N-1)m(N)} \quad (17)$$

$$P(N)=1/\rho\{I-h(N)\zeta^T(N)\}P(N-1) \quad (18)$$

The principles of the auxiliary variable method are as follows. By substituting equation (15) into equation (16), then $$\hat{\theta}(N) = \theta + \left(\left[\sum_{k=1}^{N}\rho^{N-k}m(k)\zeta^T(k)\right]\right)^{-1}\left[\sum_{k=1}^{N}\rho^{N-k}m(k)r(k)\right]. \quad (19)$$

Thus, if the auxiliary variable is selected such that the second item at the right side in formula (19) becomes zero, the estimated value of θ is equal to the true value of θ. Here, in the present embodiment, the auxiliary variable is a variable which has been delayed to the extent that there is no correlation between the formula error r(k) and $\zeta(k)=[-\xi_{y1}(k)-\xi_{y2}(k)]^T$. Namely, $$m(k)=[-\xi_{y1}(k-L)-\xi_{y2}(k-L)]^T \quad (20),$$

wherein L is the delay time.

After the transfer function is identified as described above, at the μ slope computing unit 4, a physical amount relating to the road μ slope $D_0$ is computed as follows.

$$\frac{\hat{a}_2}{\hat{a}_1} = \frac{D_0}{J_1 + J_2} \quad (21)$$

When the physical amount relating to the road μ slope $D_0$ can be computed by formula (21) in this way, if the physical amount is small for example, it can easily be determined that the friction characteristic between the tire and the road surface is in a saturated state.

Figure 2:
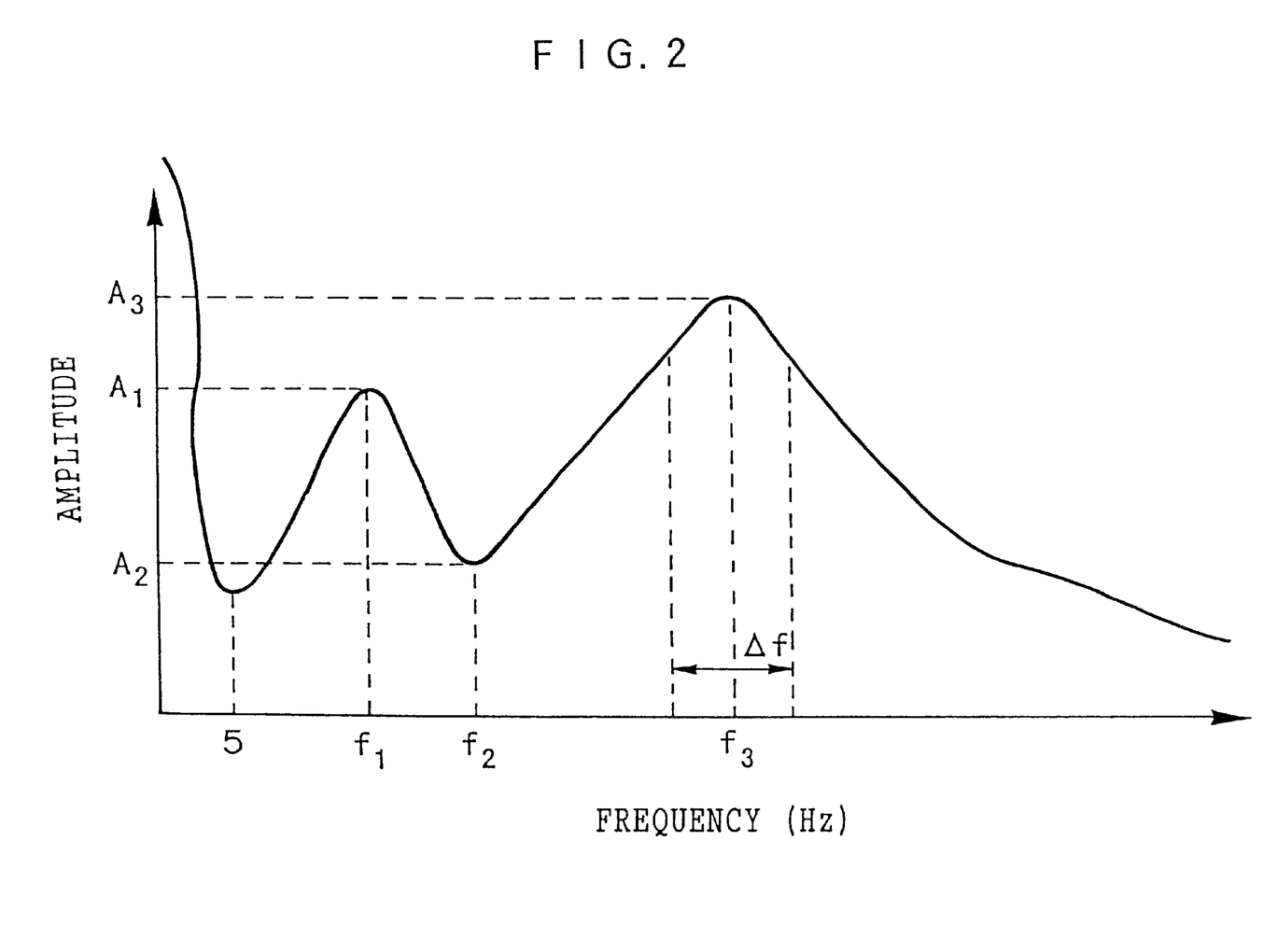
FIG. 2 is a graph showing the relationship between frequency and amplitude of a wheel speed signal.

When the detected wheel speed signal is divided in accordance with the frequency by the wheel speed detecting unit 1, as illustrated in FIG. 2, the detected wheel speed signal has two resonance points and one antiresonance point. Of the two resonance points, the resonance point at the lower frequency side is a longitudinal resonance point based on tire inertia or the like, and the frequency is $f_1$ (15–20) Hz. Further, of the two resonance points, the resonance point at the higher frequency side is a torsional resonance point, and the frequency is $f_3$ (35–40) Hz. The vehicle speed signal has an antiresonance point in a band which is insensitive with respect to various signals, and the frequency $f_2$ is (20–25) Hz. The bandpass filter 5 relating to the present embodiment extracts a portion of the wheel speed signal of a predetermined range Δf which includes the torsional resonance point (frequency $f_3$), from the wheel speed signal detected by the wheel speed detecting unit 1. Note that the bandpass filter 5 may extract, other than the torsional resonance point, a portion of the wheel speed signal of the predetermined range Δf, which includes, rather than the torsional resistance point, the longitudinal resonance point or the antiresonance point.

The vibration level computing unit 6A computes the vibration level G(N) of the wheel speed signal determined by the following formula. The output of the band pass filter 5 is ω(k).

$$G(N) \stackrel{def}{=} \sum_{k=1}^{N}\rho^{N-k}(\omega(k))^2$$

wherein ρ is the forgetting coefficient and is equal to approximately 0.99.

The vibration level computing unit 6A actually successively computes the gradualizing formula $$G(N)=\rho G(N-1)+\omega(N)^2$$

at each computation timing. The reason why the vibration level is computed at the vibration level computing unit 6A is that, as described previously, the road μ slope is not estimated accurately due to the wheel riding over a projection or the like (see FIG. 10).

Figure 3:
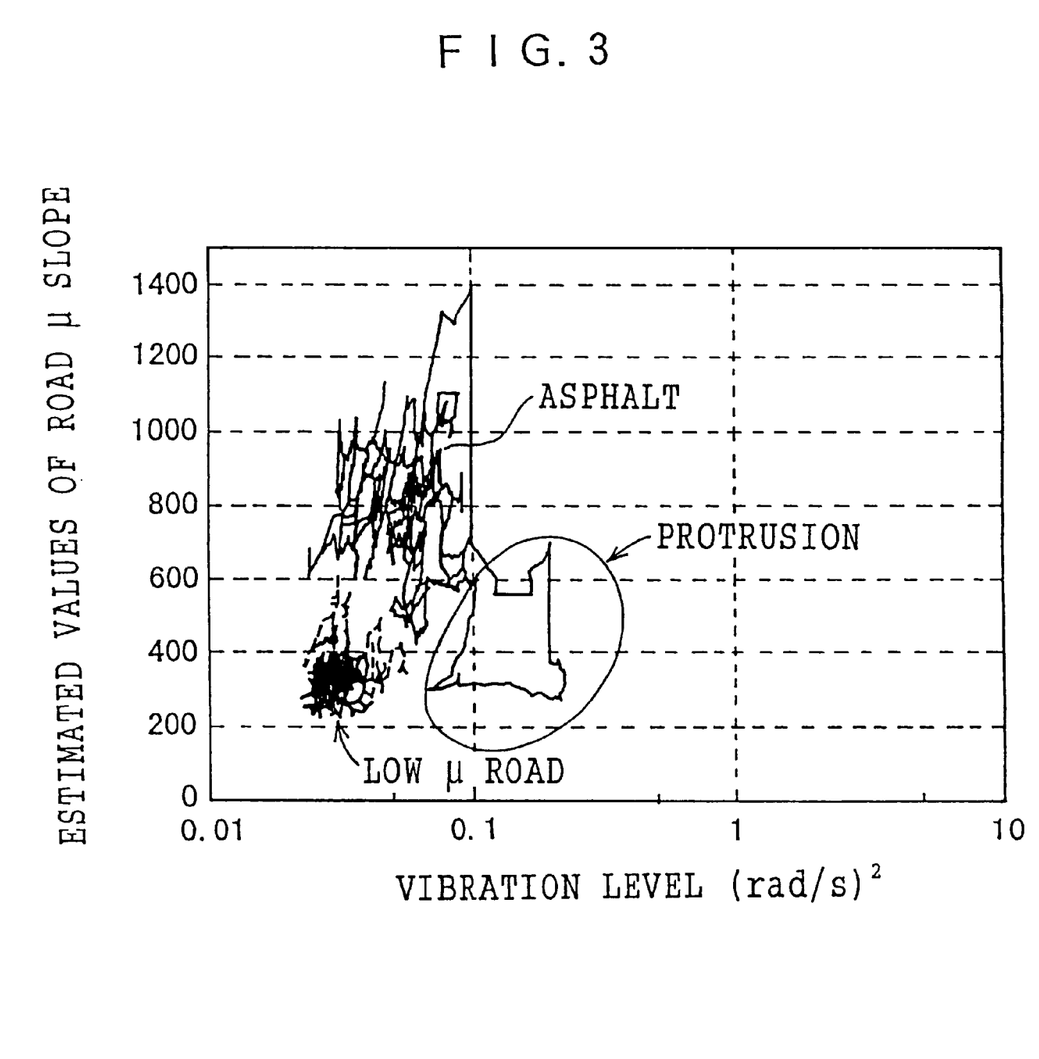
FIG. 3 is a graph showing the relationship between a vibration level of a wheel speed signal and a road $\mu$ slope on an asphalt road and on a low $\mu$ road.
Figure 4:
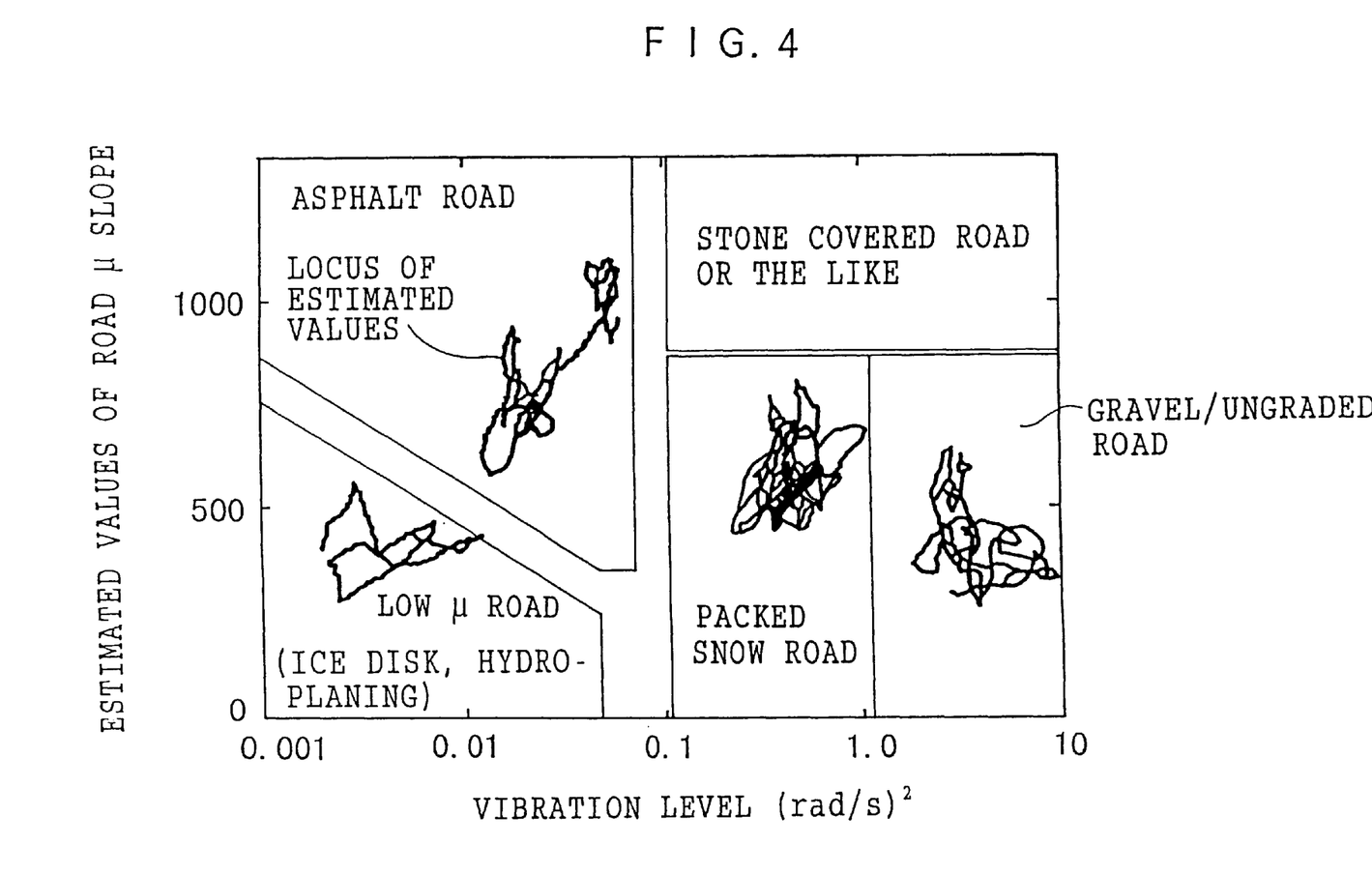
FIG. 4 is a graph showing the relationship between a vibration level of a wheel speed signal and a road $\mu$ slope for each road state.

On the other hand, when the vibration levels and estimated values of the road μ slope obtained in this way are plotted for an asphalt road surface and for a road surface of a low μ road, as shown in FIG. 3, the asphalt road surface and the road surface of the low μ road can be clearly differentiated and distinguished. Further, even if the wheel rides over a projection on an asphalt road surface, it can clearly be differentiated and distinguished from the region of the low μ road. In view of the aforementioned, the present inventors determined the relationship between the vibration level and the estimated value of the road μ slope for each of various types of road surface states. The present inventors obtained experimental results demonstrating that, as shown in FIG. 4, the vibration level and the estimated value of the road μ slope can be clearly differentiated and distinguished for each region for each road surface state, e.g., for each region for each of a low μ road, an asphalt road, a stone pavement road, a packed snow road, and a gravel/ungraded road. In other words, for example, the estimated value of the road μ slope for a packed snow road is a slightly lower value than that of high μ roads (asphalt roads or stone pavement roads), and the differences in the regions are expressed by the different vibration levels. A gravel road or the like is in a region where the vibration level is high, and the estimated value of the road μ slope is a value which is lower than that for high μ roads.

The road coefficient state estimating unit 7 estimates the friction state of the wheel with respect to the road surface on the basis of the vibration level computed by the vibration level computing unit 6A and the estimated value of the road μ slope computed by the μ slope computing unit 4, and on the basis of the relationship between the two (see FIG. 4) for each road surface state.

In the present embodiment, the bandpass filter 5 extracts, from the wheel speed signal, a portion of the wheel speed signal at either one of the two resonance points, or a portion of the wheel speed signal at the antiresonance point. In other words, as illustrated in FIG. 2, an attempt is made to detect a portion of the wheel speed signal having a frequency greater than a low frequency region. The reason why an attempt is made to detect a portion of the wheel speed signal at which the frequency is lower than a low frequency region is that, as shown in FIG. 2, the portion of the wheel speed signal at which the frequency is lower than a low frequency region has a great effect because the error thereof is great, and the road friction state cannot be estimated accurately.

Figure 5:
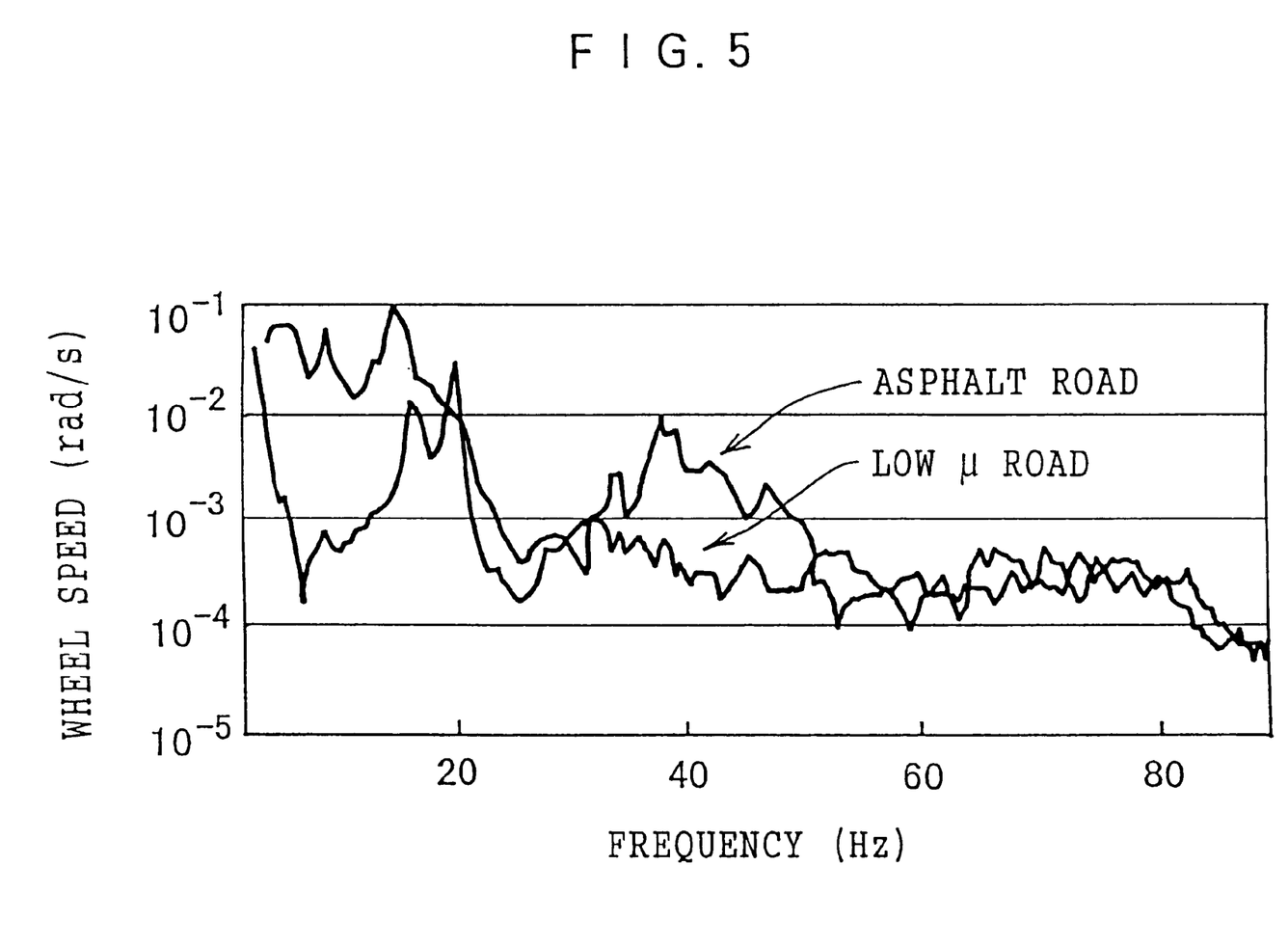
FIG. 5 is a graph showing frequency characteristics of wheel speed signals.

FIG. 5 illustrates frequency characteristics of wheel speed signals at times of traveling on an asphalt road and on a low μ road. Compared with an asphalt road, a low μ road has convexities and concavities which are extremely small.

Looking at the resonance characteristic in a vicinity of 40 Hz, it can be understood that, for a low μ road, the vibration level is small as compared with an asphalt road, and the convex and concave portions of the road surface are well reflected. The strength of the resonance is low, and it can be estimated by the present method that the road is a low μ road.

When the vibration components of the low frequency region (5 Hz or less) are considered, it is noted that, in this region, the vibration level increases proportionally to the reciprocal of the road μ slope. Therefore, the vibration level of the portion of the wheel speed signal in the low frequency region of a low μ road becomes greater than the vibration level of the portion of the wheel speed signal in the low frequency region of an asphalt road.

Accordingly, when the vibration level and the road μ slope are computed on the basis of the portion of the wheel speed signal in the low frequency region and the road state is estimated, the following problems arise.

Namely, the frequency component of the low frequency range depends on the road μ slope and does not reflect the convex and concave state of an actual road surface. As a result, a large number of adapting processes is required in order to prepare a map for judging the road surface.

The portion of the wheel speed signal in the low frequency region includes vibration components due to rolling and pitching of the vehicle. Thus, there are cases in which the road surface state cannot be judged accurately by the traveling conditions.

For the above reasons, a map for judging the road surface must be prepared in accordance with the physical parameters of the tire and the vehicle. However, dealing with changes in physical parameters at times when parts of the vehicle are changed, such as the changing of a tire or the like, is difficult. In some cases, it may not be possible to judge the road surface state.

In contrast, in the present embodiment, a portion of a wheel speed signal in a region greater than a low frequency region is the object. Thus, the above-described problems do not arise, and the road surface state can be judged accurately.

Figure 6:
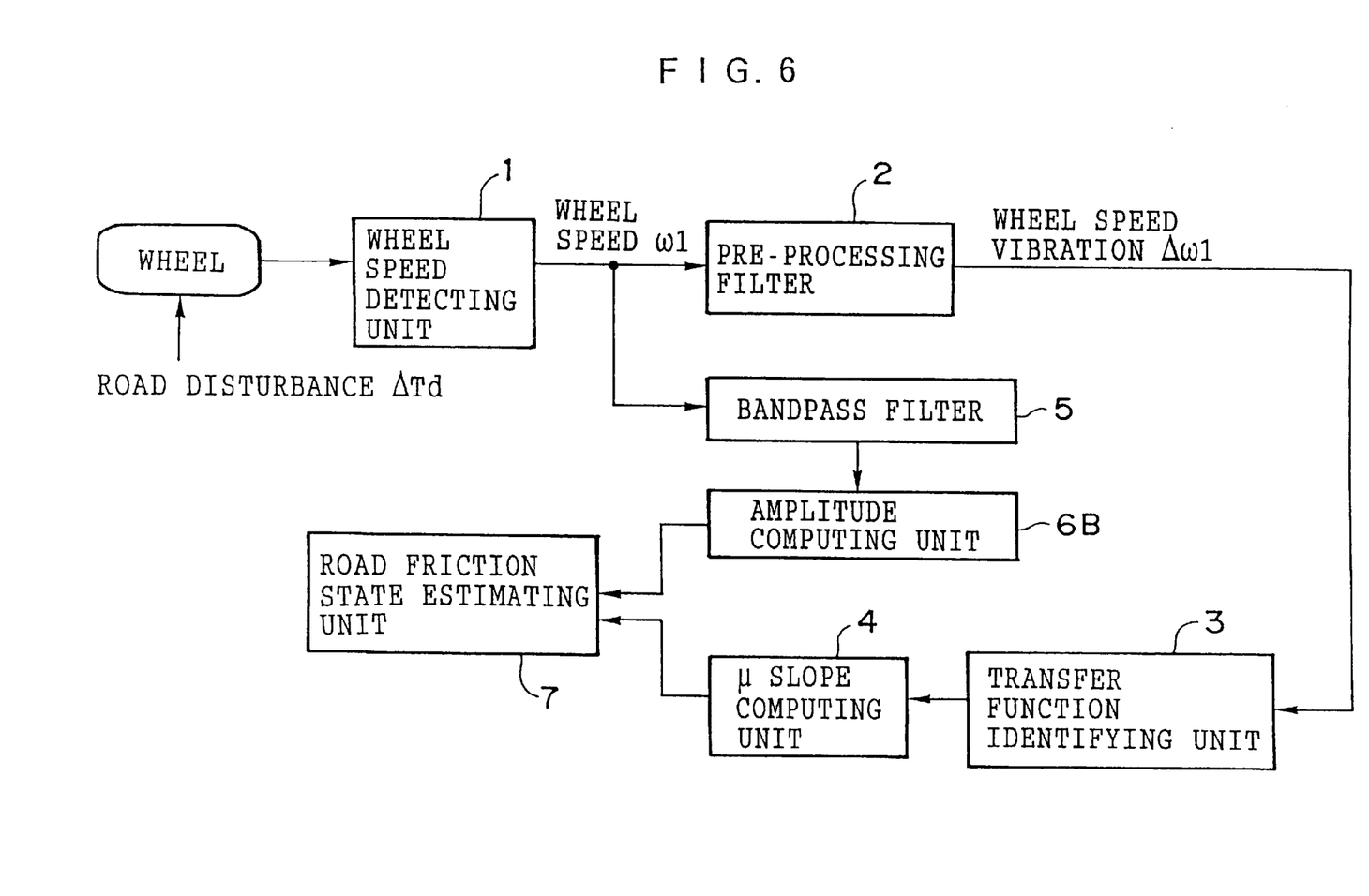
FIG. 6 is a block diagram of the second embodiment of the present invention.

Next, a second embodiment of the present invention will be described with reference to FIG. 6. The structure of the present second embodiment has structural portions which are similar to those of the previously-described first embodiment. The same portions are denoted by the same reference numerals, and description thereof is omitted. Only the different portions are explained.

Namely, the device for estimating a road friction state relating to the present second embodiment is equipped with an amplitude computing unit 6B instead of the vibration level computing unit 6A relating to the first embodiment.

Next, operation of the present second embodiment will be described. Because parts of the operation of the present second embodiment are similar to those of the previously-described first embodiment, description of the same parts of the operation will be omitted, and only the different parts of the operation will be described.

The amplitude computing unit 6B relating to the present second embodiment computes the amplitude of a portion of a vehicle speed signal of a predetermined frequency which is extracted by the bandpass filter 5. The specifics are as follows.

Namely, in order to determine the amplitude of a predetermined frequency f, a value Si of a sine function and a value Ci of a cosine function described later are used.

Namely, given that the sampling time is TS, $$n = \frac{1}{T_s - f}$$

is determined. Given that the wheel speed signal whose amplitude is to be determined is y and the value of the wheel speed signal at the time of the present sampling is y(N), then Real=$C_n \cdot y(N)+C_{n-1} y(N-1)+ \ldots +C_1 \cdot y(N-n+1)$ Img=$S_n \cdot y(N)+S_{n-1} y(N-1)+ \ldots +S_1 \cdot y(N-n+1)$ $A=\sqrt{\text{Real}^2+\text{Img}^2}$ wherein $$\begin{cases} C_i = \frac{2}{n}\cos\left(\frac{2\pi}{n}i\right) \\ S_i = \frac{2}{n}\sin\left(\frac{2\pi}{n}i\right) \end{cases}$$

An amplitude A is thereby determined.

The present inventors discovered that the relationship between the estimated value of the road μ slope and the amplitude computed as described above is separate for each region for each road surface state, such that the road surface states can be clearly differentiated and distinguished.

Figure 7:
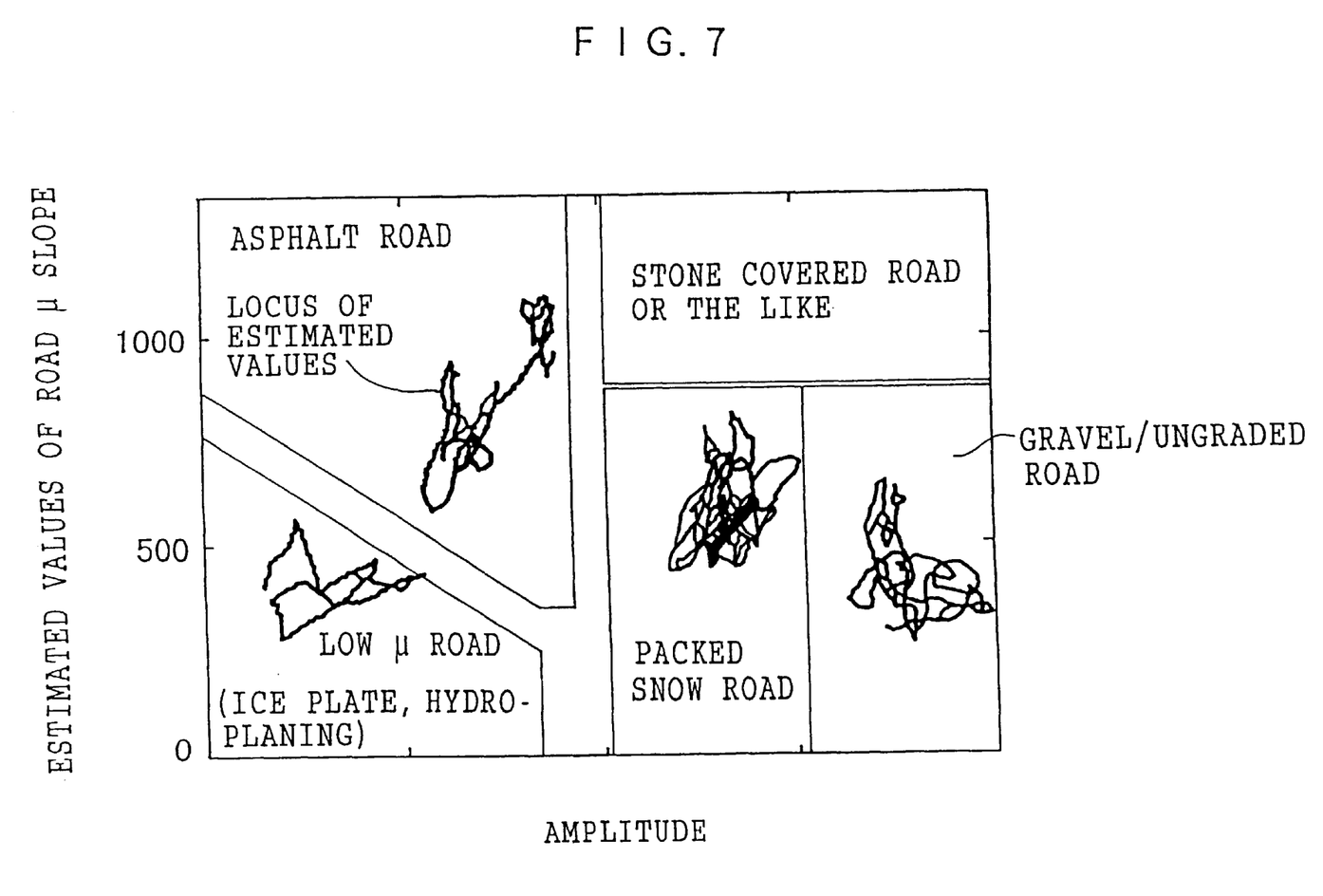
FIG. 7 is a graph illustrating the relationship between an amplitude of a wheel speed signal and a road $\mu$ slope for each road state.

The road friction state estimating unit 7 relating to the present second embodiment estimates the road friction state on the basis of the relationship (see FIG. 7) between the road μ slope computed by the μ slop computing unit 4 and the amplitude computed by the amplitude computing unit 6B.

Next, a third embodiment of the present invention will now be described. Because the structure of the present third embodiment includes the same portions as the structure of the previously-described first embodiment, the same portions are denoted by the same reference numerals, and description thereof will be omitted. Only the portions that differ will be described.

Figure 8:
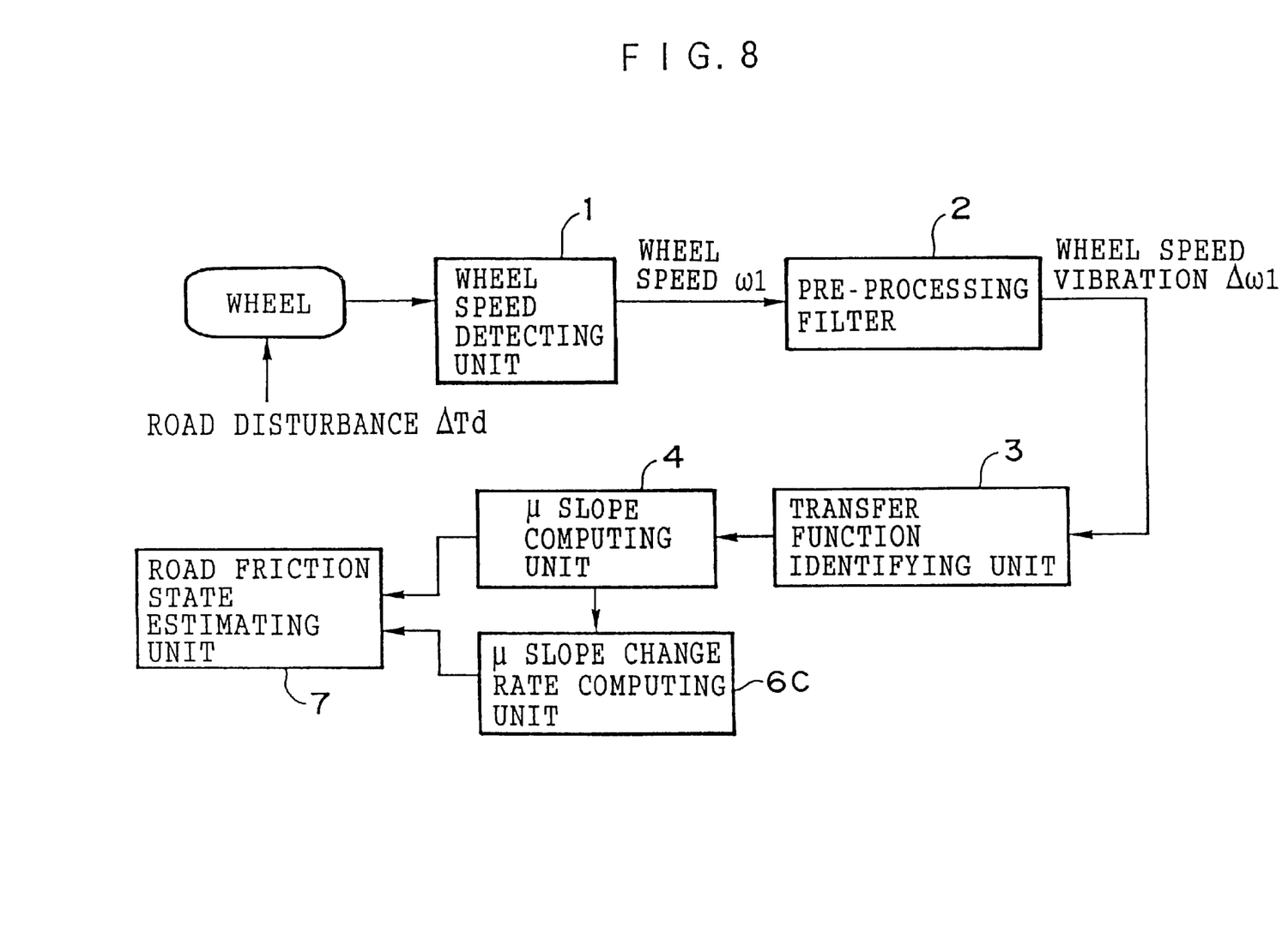
FIG. 8 is a block diagram of a third embodiment of the present invention.

The device for estimating a road state relating to the present third embodiment includes the wheel speed detecting unit 1, the pre-processing filter 2, the transfer function identifying unit 3, and the μ slope computing unit 4. The device for estimating a road friction state relating to the present third embodiment also includes a μ slope change rate computing unit 6C which computes the rate of change in the road μ slope computed by the μ slope computing unit 4.

Figure 9:
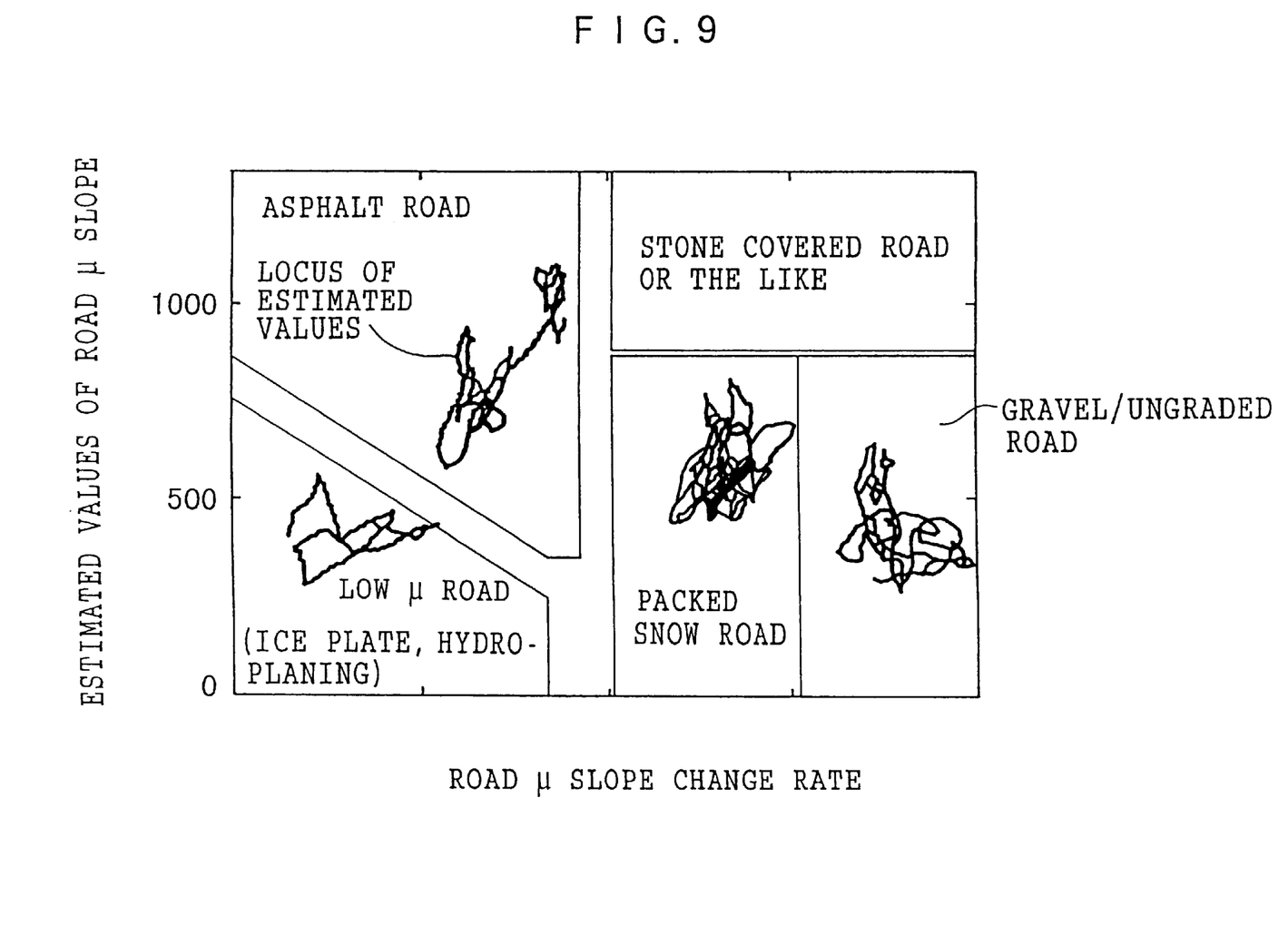
FIG. 9 is a graph illustrating the relationship between a road $\mu$ slope and a rate of change in the road $\mu$ slope for each road state.

The present inventors found that the rate of change in the road μ slope and the estimated value of the road μ slope are separate for each region in accordance with the road surface state such that the road surface states can be clearly distinguished and differentiated, as illustrated in FIG. 9.

A road friction state estimating unit 7 relating to the present third embodiment estimates the friction state of the wheel with respect to the road surface on the basis of the aforementioned relationship (see FIG. 9) and on the basis of the road μ slope computed by the μ slope computing unit 4 and the rate of change in the road μ slope computed by the μ slope change rate computing unit 6C.

In the above-described first through third embodiments, the road μ slope is computed. However, the present invention is not limited to the same, and a braking torque slope which is equivalent to the road μ slope may be computed.

As described above, in the present invention, in order to estimate the friction state of a wheel with respect to a road surface, a portion of a wheel speed signal of a predetermined region which is greater than a low frequency region is extracted. Thus, an excellent effect is achieved in that the friction state of the wheel with respect to the road surface can be judged accurately.

What is claimed is:

1. A device, for use with a vehicle having wheels, for estimating a road friction state, said device comprising:

a sensor which detects a wheel speed signal;

a filter which receives the signal and passes a portion of the wheel speed signal having a frequency within a predetermined range, the range including at least one resonance point or at least one antiresonance point;

a computer which computes a physical amount expressing a magnitude of vibration of a wheel, on the basis of the portion of the wheel speed signal passed by the filter;

an estimator which estimates a physical amount expressing ease of slippage of the wheel, on the basis of the portion of the wheel speed signal passed by the filter; and a road friction state estimator which estimates a friction state of the wheel with respect to a road surface, on the basis of the physical amount expressing the magnitude of the vibration of the wheel computed by the computer and the physical amount expressing the ease of slippage of the wheel estimated by the estimator.

2. A device, for use with a vehicle having wheels, for estimating a road friction state according to claim 1, wherein the physical amount expressing the magnitude of the vibration of the wheel is a vibration level of the portion of the wheel speed signal passed by the filter.

3. A device, for use with a vehicle having wheels, for estimating a road friction state according to claim 1, wherein the physical amount expressing the magnitude of the vibration of the wheel is an amplitude of the portion of the wheel speed signal passed by the filter.

4. A device, for use with a vehicle having wheels, for estimating a road friction state according to claim 1, wherein the estimator which estimates a physical amount expressing an ease of slippage of the wheel includes:

a pre-processing filter for detecting from the signal produced by the sensor, a wheel speed vibration of each wheel as response outputs of a wheel resonance system which receives road surface disturbance;

a transfer function identifier which identifies a transfer function of each wheel corresponding to the detected wheel speed vibration; and a friction coefficient slope computer for computing, on the basis of the identified transfer function and for each wheel, a slope of a coefficient of friction between a tire and a road surface, as the physical amount expressing ease of slippage.

5. A device, for use with a vehicle having wheels, for estimating a road friction state according to claim 4, wherein the pre-processing filter is a bandpass filter through which passes frequency components of a predetermined band whose center is a frequency estimated to be a frequency of the resonance point.

6. A device, for use with a vehicle having wheels, for estimating a road friction state, said device comprising:

a sensor which detects a wheel speed signal;

an estimator which estimates a physical amount expressing an ease of slippage of a wheel, on the basis of the wheel speed signal detected by the sensor;

a computer which computes a rate of change in the physical amount expressing the ease of slippage of the wheel which was estimated by the estimator; and a road friction state estimator which, on the basis of the physical amount expressing the ease of slippage of the wheel estimated by the estimator and the rate of change in the physical amount expressing the ease of slippage of the wheel computed by the computer, estimates a friction state of the wheel with respect to a road surface.

7. A device, for use with a vehicle having wheels, for estimating a road friction state according to claim 6, wherein the estimator which estimates a physical amount expressing an ease of slippage of the wheel includes:

a pre-processing filter which detects, from the wheel speed signal detected by the detector, a wheel speed vibration of each wheel as response outputs of a wheel resonance system which receives road surface disturbance;

a transfer function identifier which identifies a transfer function of each wheel corresponding to the detected wheel speed vibration; and a friction coefficient slope computer which computes, on the basis of the identified transfer function and for each wheel, a slope of the coefficient of friction between a tire and a road surface, as the physical amount expressing ease of slippage.

8. A device, for use with a vehicle having wheels, for estimating a road friction state according to claim 7, wherein the pre-processing filter is a bandpass filter through which passes frequency components of a predetermined band whose center is a frequency estimated to be a frequency of the resonance point.

9. A method of estimating a road friction state comprising the steps of:

detecting a wheel speed signal;

passing, from the detected wheel speed signal, a portion of the wheel speed signal having a frequency within a predetermined range which includes at least one resonance point or at least one antiresonance point;

computing a physical amount expressing a magnitude of vibration of a wheel, on the basis of the passed portion of the wheel speed signal;

estimating a physical amount expressing ease of slippage of the wheel, on the basis of the passed portion of the wheel speed signal; and estimating a friction state of the wheel with respect to a road surface, on the basis of the computed physical amount expressing the vibration of the wheel and the estimated physical amount expressing the ease of slippage of the wheel.

10. A method of estimating a road friction state according to claim 9, wherein the physical amount expressing the magnitude of the vibration of the wheel is a vibration level of the passed portion of the wheel speed signal.

11. A method of estimating a road friction state according to claim 9, wherein the physical amount expressing the magnitude of the vibration of the wheel is an amplitude of the passed portion of the wheel speed signal.

12. A method of estimating a road friction state according to claim 9, wherein the step of estimating a physical amount expressing ease of slippage of the wheel includes the steps of:

detecting, from the detected wheel speed signal, a wheel speed vibration of each wheel as response outputs of a wheel resonance system which receives road surface disturbance;

identifying a transfer function of each wheel corresponding to the detected wheel speed vibration; and computing, on the basis of the identified transfer function and for each wheel, a slope of a coefficient of friction between a tire and a road surface, as a physical amount expressing the ease of slippage.

13. A method of estimating a road friction state according to claim 12, wherein in the step of detecting a wheel speed vibration of each wheel, frequency components of a predetermined band whose center is a frequency estimated to be a frequency of the resonance point, substantially pass therethrough.

14. A method of estimating a road friction state comprising the steps of:

detecting a wheel speed signal;

estimating a physical amount expressing ease of slippage of a wheel, on the basis of the detected wheel speed signal;

computing a rate of change in the estimated physical amount expressing the ease of slippage of the wheel; and estimating a friction state of the wheel with respect to a road surface, on the basis of the estimated physical amount expressing the ease of slippage of the wheel and the computed rate of change in the physical amount expressing the ease of slippage of the wheel.

15. A method of estimating a road friction state according to claim 14, wherein the step of estimating a physical amount expressing ease of slippage of the wheel includes the steps of:

detecting, from the detected wheel speed signal, a wheel speed vibration of each wheel as response outputs of a wheel resonance system which receives road surface disturbance;

identifying a transfer function of each wheel corresponding to the detected wheel speed vibration; and computing, on the basis of the identified transfer function and for each wheel, a slope of a coefficient of friction between a tire and a road surface, as a physical amount expressing the ease of slippage.

16. A method of estimating a road friction state according to claim 15, wherein in the step of detecting a wheel speed vibration of each wheel, frequency components of a predetermined band whose center is a frequency estimated to be a frequency of the resonance point, substantially pass therethrough.

\* \* \* \* \*